United States Patent [19]
McAllister et al.

[11] Patent Number: 5,290,913
[45] Date of Patent: Mar. 1, 1994

[54] METHOD AND APPARATUS FOR THE HEAT TREATMENT OF MATERIAL

[75] Inventors: Mark L. McAllister; Steven J. French, both of Louisville, Ky.

[73] Assignee: Carrier Vibrating Equipment, Inc., Louisville, Ky.

[21] Appl. No.: 958,280

[22] Filed: Oct. 8, 1992

[51] Int. Cl.⁵ .......................... C08F 6/24; C08F 6/18
[52] U.S. Cl. .................. 528/483; 528/308.4; 528/503; 264/9; 264/345; 23/295 R
[58] Field of Search ............ 23/295 R; 264/5, 9, 264/12, 178 R, 345; 528/308.3, 308.4, 503, 481, 483

[56] References Cited

U.S. PATENT DOCUMENTS

| | | | |
|---|---|---|---|
| 1,922,283 | 8/1933 | Dering | 23/295 R |
| 2,597,643 | 5/1952 | Izard | 528/308.4 |
| 2,907,753 | 10/1959 | MacLean et al. | 528/308.4 |
| 2,965,585 | 12/1960 | Delap et al. | 264/12 |
| 3,622,555 | 11/1971 | Rothenbury et al. | 260/94.9 |
| 4,077,945 | 3/1978 | Heinze et al. | 260/75 M |
| 4,127,554 | 11/1978 | Soder | 260/37 N |
| 4,161,578 | 7/1979 | Herron | 528/272 |
| 4,289,874 | 9/1981 | Bockrath | 528/487 |
| 4,382,139 | 5/1983 | Kapteina et al. | 528/308.3 |

FOREIGN PATENT DOCUMENTS

| | | | |
|---|---|---|---|
| 0153883 | 2/1982 | Fed. Rep. of Germany | 528/308.4 |
| 60-243127 | 11/1985 | Japan | 528/503 |
| 2226320 | 6/1990 | United Kingdom | 528/503 |

*Primary Examiner*—Gary P. Straub
*Assistant Examiner*—Timothy C. Vanoy
*Attorney, Agent, or Firm*—Camoriano & Smith

[57] ABSTRACT

A method of crystallizing plastic such as polyethylene terephthlate in the form of small particles comprises the steps of placing the particles in a liquid bath such as water, agitating the bath using jets of hot gas such as steam while simultaneously raising the temperature of the particles to a level at which the plastic crystallizes to a predetermined level of crystallinity. The particles are thereafter separated from the bath and dried.

12 Claims, 2 Drawing Sheets

METHOD AND APPARATUS FOR THE HEAT TREATMENT OF MATERIAL

BACKGROUND OF THE INVENTION

This invention pertains to a method and apparatus for the heat treatment of material and, more particularly, to a method and apparatus for the treatment of material by immersion of the material in a turbulent liquid interspersed with a plurality of jets of hot gas.

Certain plastic materials, notably polyethylene terephthlate (PET) and the like are preferably commercially used in a state of semi-crystallinity. Typical thermoplastic materials which can achieve this state have relative high melting points and are characterized by having crystalline regions interspersed among amorphous regions. To obtain a semi-crystalline state with such thermoplastic materials, sustained heating of the materials at a predetermined temperature range is required. The temperature level and duration of heating needed to reach a desired level of crystallinity depends, inter alia, upon a number of parameters such as the type of material and particle size as it is well recognized that some polymers crystallize much faster than others at the same temperature levels. It has been additionally recognized that crystallinity occurs at faster rates when particles of the material as opposed to bulk material are treated. For purposes of this description the words "particle" or "particles" will be used to describe the material being processed in particle form, but the use of such words should not be construed as limiting with respect to specific dimensions of the material being treated.

A typical industrial process for crystallizing plastic materials uses hot air distributed over material generally comminuted into small pieces and arranged in thin layers so as to allow as much exposure as possible to the air. The temperature of the material is raised to a level above its glass transition temperature which is well below its melting point. At these levels, the crystalline regions of the material are unaffected but the amorphous regions become soft. Crystallization is initiated at various locations within the amorphous regions and semicrystalline solid spherulites start growing about nuclei. Completion of the crystallinity process is basically completed when the whole material, i.e., each particle, has been converted to a spherulite semicrystalline solid.

A practical problem with the hot air process for crystallizing material, however, is the length of time needed to reach the desired state of crystallinity. Heating periods often exceed an hour or more which is not compatible with continuous processing. Additionally the material becomes tack during heating, resulting in significant handling difficulties.

A recent innovation developed to overcome the long processing time has been the use of high energy radio frequency waves to couple with thin layers of thermoplastic material such as PET on a moving conveyor belt. The PET is heated to temperatures of about 325° F. and undergoes crystallization while on the moving belt. Because the PET is placed in thin layers the tackiness is less than in the hot air processes. Tackiness is not eliminated, however, since the thermoplastic particles remain in abutting relationships with each other throughout the treatment.

Thus, it is desirable to have an apparatus and method which could treat the thermoplastic materials so as to achieve the desired state of crystallinity in a short period of time without the handling problems associated with the tackiness of the material.

SUMMARY OF THE INVENTION

The present invention provides for a method which eliminates the contact between plastic material undergoing crystallization temperatures, thus avoiding the problems associated with tackiness as in prior art processes and apparatus. The process contemplates the placing of particles of a thermoplastic material capable of crystallization and of a predetermined size in a liquid bath, heating the bath and particles to a temperature sufficient to initiate crystallization in the amorphous regions thereof, agitating the liquid and thus the particles while undergoing crystallization and thereafter drying the material before further processing.

An apparatus in accordance with one preferred embodiment of the present invention comprises a container for holding the liquid bath and material to be heat treated, a perforated divided wall separating the container from a chamber for receiving a gas under pressure, and a source of for supplying the gas to the chamber under the requisite pressure. The liquid can agitated either by an external device such as a vibratory motor attached to the container or through the use of the gas entering into the liquid under pressure through the openings in the perforated wall. In another preferred embodiment providing for a continuous process, the material in particle form is provided a resultant motion from the point of entry into the liquid, then across the liquid as it is being heat treated, and finally toward and up an inclined ramp leading out of the liquid bath whereupon the material may then be dried. The movement of the material may be provided by a vibratory motion in which the resultant throw of the motion moves the particles in the desired direction.

Still other objects of the present invention will become readily apparent to those skilled in the art from the following description wherein there is shown and described a preferred embodiment of this invention. As it will be realized, the invention is capable of being modified in various, obvious aspects all without departing from the invention. Accordingly the drawings and descriptions will be regarded as illustrative in nature and not as restrictive.

DETAILED DESCRIPTION OF THE PREFERRED EMBODIMENT OF THE INVENTION

Figure 1:
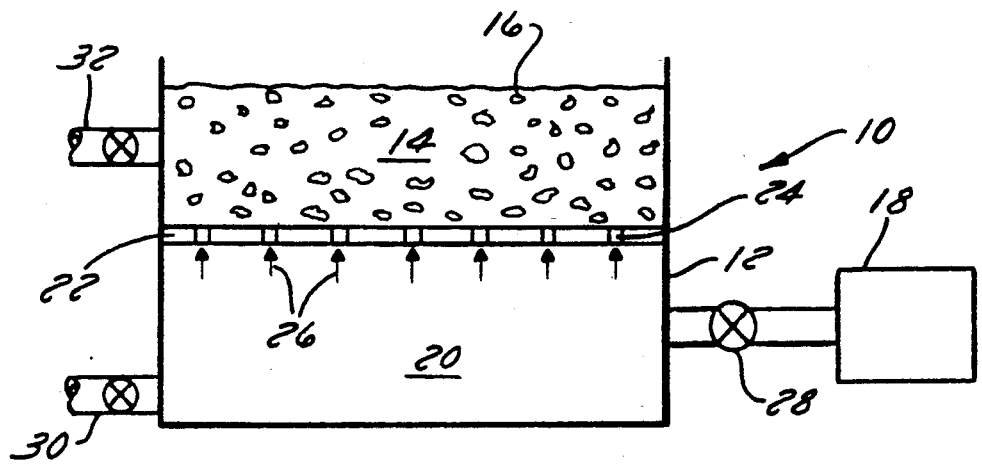
FIG. 1 is a schematic representation of batch apparatus in accordance with the present invention.

The schematic of FIG. 1 details a simple apparatus 10 which may be employed to heat treat materials such as thermoplastics capable of reaching a semicrystalline state. Container 12 as shown is holding a liquid 14 such as water, for example. Mixed with the water are pieces or particles 16 of a material to be heat treated. A heated gas is pumped under pressure from a source 18 into chamber 20 separated form container 12 by a perforated dividing wall 22. Wall 22 is provided with a plurality of spaced openings 24. The heated gas under pressure moves through the openings 24 as indicated by the arrows 26 into liquid 14. The gas both heats and agitates the liquid and particles. Once the material has been treated, the gas flow into chamber 20 is stopped by closing valve 28 and the liquid in container 12 is then free to flow into chamber 20 and out through drain 30 and associated open valve 32. The treated material remains in container 20 and is removed or further treated as desired.

Figure 2:
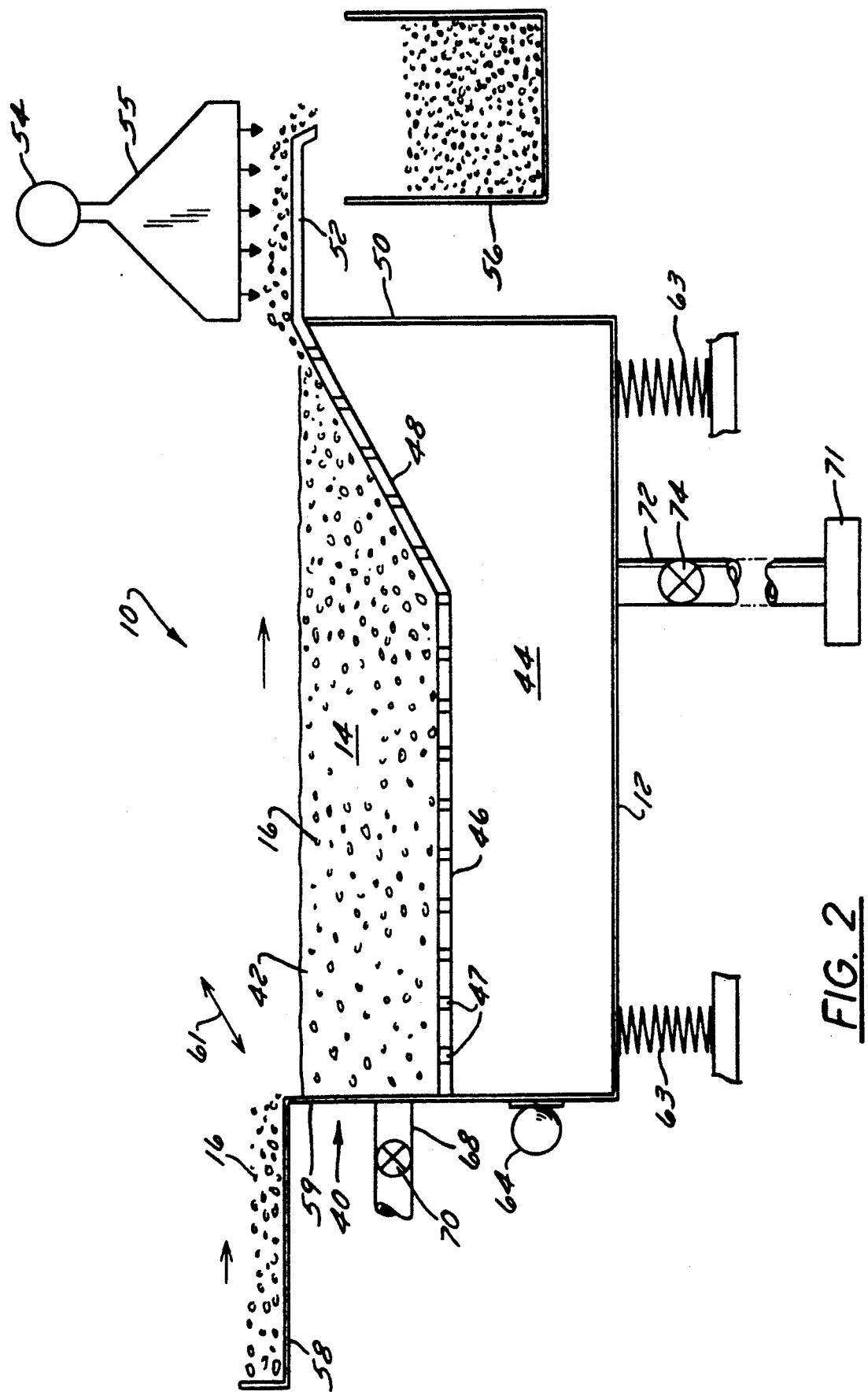
FIG. 2 is a schematic representation of a continuous operation apparatus using a vibratory motor to provide motion to the material being processed.

The continuous heat treatment apparatus of FIG. 2 is provided with a vibratory carriage assembly 40 comprising a container 42 and a chamber 44 separated by a perforated dividing wall 46 provided with a multiplicity of openings 47. Wall 46 merges into an upwardly angled ramp 48 which abuts the top of one of the end walls 50 of assembly 40. A particle drying and removal platform 52 is horizontally mounted to or is integrally connected with end wall 50 and extends away from the interior of container 12. Positioned above platform 52 is a blower 54 and dry gas distributor 55. A hopper 56 is located at one end of the platform to receive particles of material once drying has been completed.

Carriage assembly 40 is mounted on a plurality of springs 63 which are properly tuned to the frequency of vibratory motor 64 mounted against assembly 40 to impart appropriate vibratory motion thereto. While any conveying apparatus may be employed to bring the material to the assembly for heat treatment, it has been found to be expedient to use a simple material conveying platform 58 mounted directly to end wall 59. Thus, the vibratory motion imparted to the assembly 40 is also provided to the particles on platform 58, the motion of the throw being from left to right in the plane of the drawing as shown by arrow 61.

In operation, particles 16 of appropriate dimension are deposited on platform 58. For example, in the case of PET as the material, particles of between about 1/16 inch to ¼ inch may be conveniently used. The throw of the vibratory motion of the assembly 40 causes the particles piled on platform 58 to move toward the container 42. A liquid such as water is allowed to enter container 42 through line 68 and open valve 70. Simultaneously, chamber 44 is pressurized with a hot gas provided by pump/heater 71 (shown in block) entering through line 72 and open valve 74. The pressurized gas forces its way upwardly through the openings 47 and bubbles upwardly through the accumulated liquid and the particles mixed therewith. The vibratory motion of assembly 40 and the bubbling action of the gas provides the requisite agitation to the liquid. The particles are heated to the temperature desired by contact with the liquid and hot gas bubbles during the time interval taken for a particle to cross container 42. The time interval can be controlled by the frequency or amplitude of the throw provided by motor 64 or by stopping and starting motor 64.

When the particles reach and are caused to move up ramp 48, a flow of drying gas is distributed over the particles by drying gas distributor 55 as the particles continually move toward the receiving hopper 56. The length of time that the particles are immersed in the liquid and the temperature thereof are predetermined in accordance with the nature of the heat treatment desired and the physical characteristics of the constituents involved in the process such as, for example, specific heats, heat transfer coefficients and densities of the liquid and gas. For example, when plastics are being treated to increase the degree of semi-crystallinity, water may be the preferred choice, not only for its inertness relative to the material being treated but because it possess a high specific heat coefficient. Thus, when water is employed, the maximum water temperature will be 212° F., but the gas can be at any desired level. For example the typical temperature ranges of steam as the gas of choice will be from about 200° to 300° F., preferably 230° F. to 260° F., at a pressure of from about 8 psig to 20 psig.

The divider bottom wall 46 is preferably provided with openings of about 1/16 inch to 3/16 inch in diameter. The number of openings per inch is about 4 to 8. It has been determined that the percentage of "open space" in the bottom wall 46 is about 0.6% to 4.9% that is the most suitable to provide the gas jet density, i.e., the number of jets per unit area of the bottom wall surface, needed to further heat the particles in the liquid. The size and pattern of the openings should be selected such that a uniform pressure distribution results over the area of the divider wall 46.

Figure 3:
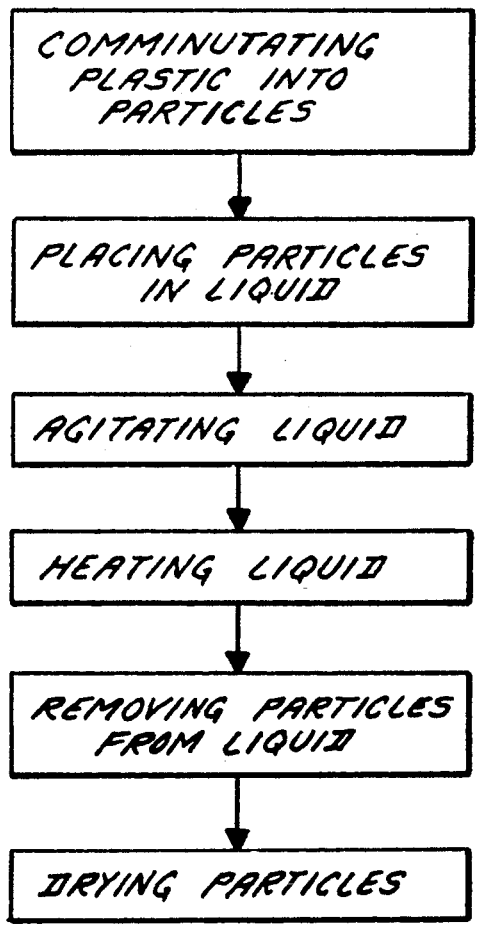
FIG. 3 is a block diagram illustrating the steps involved in a method of treating materials in accordance with the present invention.

The particular process for heat treating material in accordance with the present invention may be best understood in reference to the block diagram of FIG. 3. The first step of the preferred process the thermoplastic material is comminutated into small pieces of between about 1/16 inch to ¼ inch. The particles are then placed into a and mixed with a liquid bath which is inert with respect to the particles. As has been stated before, an ideal medium is water with respect to most thermoplastic materials. The liquid then is heated to a point in which the plastic softens in the non-crystalline regions. In the case of water, the maximum temperature is 212° F. and only marginally high enough to initiate crystallization in most plastics. Crystallization of PET, for example, proceeds very slowly when immersed only in boiling water. Thus, it is necessary when using water in this particular situation to supplement the heating by water with a hot gas which jets into the liquid bath and impacts the particles submerged therein. Steam, for example, is ideally suitable in heating plastics. The hot gas contacting the particles raises the average temperature of a particle to a point where more rapid crystallization occurs. Additionally, the hot jets of steam also serve to further agitate the boiling water.

Once the particles of thermoplastic material reach the desired state of semi-crystallinity, the particles should be separated from the liquid. The time taken to reach this state depends upon a variety of parameters, not the least of which is particle size and the physical characteristics of the liquid and gas as stated above. The jets of hot gas promote more rapid crystallization since, other variables being held constant, it has been noted that an increase in the amount of hot gas impinging on the particles appears to result in greater transfer of heat and a resultant increase in the average temperature of the particles.

While the physical mechanism is not completely understood, it has been additionally observed that the turbulent hot liquid, particularly water when used with PET materials, tends to dissipate the tacky or sticky attribute associated with the crystallization temperatures. That is, when the particles immerse from the liquid bath following treatment, the tackiness observed with other prior art processes is minimal.

Once the thermoplastic material is removed from the liquid bath, it is important that the particles be completely dry before further processing. This is particularly true with respect to particles that are going to be subjected to extrusion. Incomplete drying may result in a detrimental finish to the product formed from the plastic. Drying may be accomplished by any suitable technique such as dry air properly distributed over the particles.

As an example, crystallization of PET occurs much more rapidly when exposed to hot water and jets of steam under pressure as described herein. The superiority of crystallizing thermoplastic materials in accordance with the present invention is easily demonstrated. Applicants, for example, broke up an 18 pound mass of PET material into particles having an average size of about 3/16 of inch in diameter. Using a small batch apparatus like that illustrated in FIG. 1 with a square deck approximately one foot on a side, the particles were immersed in turbulent water heated by a multiplicity of steam jets entering the water under a pressure of about 10 psig at a temperature of about 250° F. The particles remained suspended in the turbulent hot water for about fifteen minutes and then were removed and dried for another fifteen minutes. The particles were visually examined and all demonstrated substantial opacity, a characteristic of crystallization in plastic material. None demonstrated the characteristic transparency of the noncrystalline plastic materials. The total elapsed time was about 30 minutes compared to a time period of 2 to 2½ hours for hot air processes to accomplish the same degree of crystallization.

The foregoing description of a preferred embodiment of the invention has been presented for purposes of illustration and description. It is not intended to be exhaustive or limiting with respect to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. Method for crystallizing plastic particles comprising the steps of
    (a) placing plastic particles to be crystallized in suspension in a liquid bath;
    (b) agitating the liquid bath and suspended plastic particles by injecting a plurality of jets of hot gas into the liquid bath containing the suspended particles;
    (c) raising the temperature of the particles by the hot gas jets while suspended in the in agitated liquid bath to a level sufficient to cause the particles to begin to crystallize and maintaining said temperature level of said particles while suspended in the agitated liquid bath for a time sufficient for said particles to reach a predetermined level of crystallinity;
    (d) separating said crystallized particles from said liquid; and
    (e) drying said crystallized particles.

2. The method of claim 1 in which said liquid bath is water.

3. The method of claim 1 in which said gas is steam and liquid is heated to 212° F.

4. The method of claim 3 in which said steam is injected into said bath in the form of a plurality of jets at a pressure of between about 8 to 20 PSIG and at a temperature of between about 200° F. and 300° F.

5. The method of claim 3 in which said particles remain in said agitated water for between about 10 to 20 minutes.

6. The method of claim 5 in which said particles remain in said agitated water for about 15 minutes.

7. The method of claim 6 in which said particles are dried with a stream of dry air.

8. The method of claim 7 in which said particles are dried for about 15 minutes.

9. The method of claim 1 in which said particles comprise polyethylene terephthalate polymer.

10. The method of claim 1 in which said suspended particles are continuously moved in a predetermined direction from the position of placement in said bath to the position of separation from said bath.

11. The method of claim 10 in which said particles are continuously moved by vibration.

12. The method of claim 10 in which the particles are moved by imparting vibratory motion thereto such that the throw of the particles is in said predetermined direction.

* * * * *